US 7,221,953 B2

(12) United States Patent
Roche

(10) Patent No.: US 7,221,953 B2
(45) Date of Patent: May 22, 2007

(54) TRIGGERING EMAIL/PIM EVENTS BASED ON SMS HEADERS AND CONTENT

(75) Inventor: Mark Kenneth Roche, Austin, TX (US)

(73) Assignee: SBC Knowledge Ventures, LP, Reno, NV (US)

( * ) Notice: Subject to any disclaimer, the term of this patent is extended or adjusted under 35 U.S.C. 154(b) by 74 days.

(21) Appl. No.: 11/092,139

(22) Filed: Mar. 29, 2005

(65) Prior Publication Data

US 2006/0223513 A1 Oct. 5, 2006

(51) Int. Cl.
*H04Q 7/20* (2006.01)
(52) U.S. Cl. ................ 455/466; 455/412.1; 455/412.2; 455/413; 455/414.1; 455/414.4
(58) Field of Classification Search ................ 455/466, 455/412.1, 412.2, 413, 414.1, 414.4
See application file for complete search history.

(56) References Cited

U.S. PATENT DOCUMENTS

| 6,625,460 B1 * | 9/2003 | Patil ............................ 455/466 |
| 6,782,412 B2 * | 8/2004 | Brophy et al. .............. 709/204 |
| 2004/0148356 A1 * | 7/2004 | Bishop et al. .............. 709/206 |

* cited by examiner

*Primary Examiner*—Joseph Feild
*Assistant Examiner*—Khai Nguyen
(74) *Attorney, Agent, or Firm*—Toler Schaffer, LLP

(57) ABSTRACT

A message composed by a user using a computer is stored in a computer-readable medium. The message is associated with a distribution list of one or more intended recipients of the message, and an identifier to trigger sending of the message to the one or more intended recipients on the distribution list. An SMS message is received in an inbox of the computer. The SMS message is composed using an SMS-capable wireless device, and has a user-entered header. The user-entered header matching the identifier triggers sending of the message to the one or more intended recipients on the distribution list.

18 Claims, 2 Drawing Sheets

TRIGGERING EMAIL/PIM EVENTS BASED ON SMS HEADERS AND CONTENT

FIELD OF THE DISCLOSURE

The present disclosure relates to short message service (SMS).

BACKGROUND

At times, mobile telephone users need to communicate with a broad list of family members and friends. Some mobile telephone users use SMS to communicate wireless text messages to other SMS users defined in a buddy list on their mobile telephone. SMS enables mobile telephone users to substantially instantaneously and simultaneously communicate with multiple family members and friends. Mobile telephone users who are unfamiliar with SMS features may rely on making multiple phone calls to their family and friends, or may wait until they have access to a general purpose computer to compose e-mail messages to multiple family members and friends.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE DRAWINGS

Disclosed herein are embodiments of a method and system for triggering the sending of a pre-composed message to a distribution list based on a header and/or content in an SMS message. The method and system facilitate ease in communicating important information and/or managing other personal information management (PIM) information when the user is in a mobile environment (e.g. when the user is on the road). The method and system is well-suited to a wide variety of users, including those users who own SMS-capable telephones but rarely use the SMS features and who regularly communicate with their family and friends via email.

Figure 1:
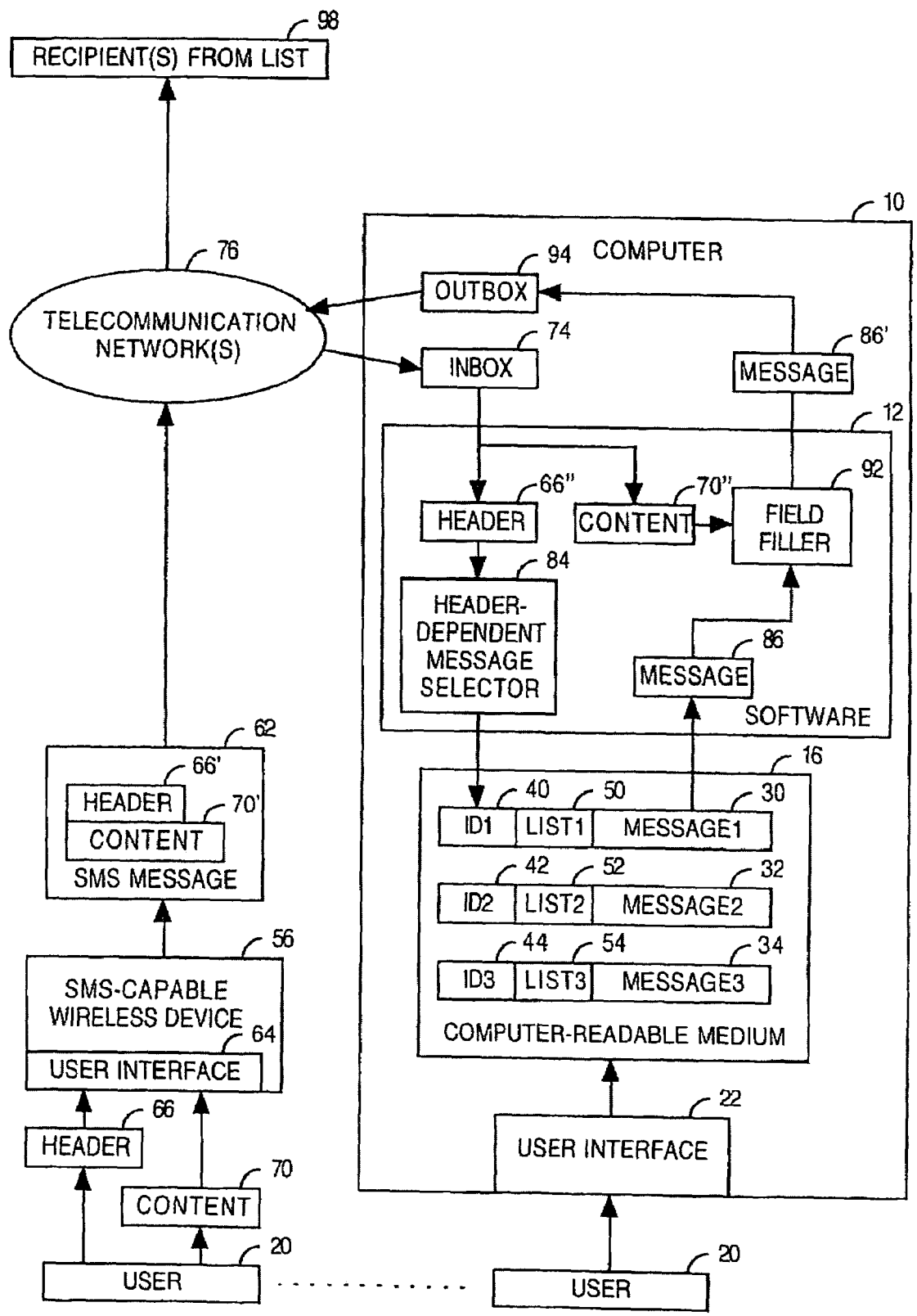
FIG. 1 is a block diagram of an embodiment of a system for triggering messages based on SMS headers and content.

Embodiments of the present invention are described with reference to FIG. 1, which is a block diagram of an embodiment of a system for triggering messages based on SMS headers and/or content, and FIG. 2, which is a flow chart of an embodiment of a method of triggering messages based on SMS headers and/or content.

The system comprises a computer 10 which runs software 12 to set up a future communication or personal information management (PIM) event. The software 12 may comprise e-mail software and/or PIM software. The software 12 may be in the form of an add-on to another e-mail and/or PIM software program, where the add-on enables the herein-disclosed features.

As indicated by block 14, the method comprises storing, in a computer-readable medium 16, a message composed by a user 20 using the computer 10. The user 20 composes the message using a user interface 22 of the computer 10. Examples of the user interface 22 include, but are not limited to, a keyboard, a voice input device, a touch screen, a touch pad, and a pointing device. The message may be completely composed by the user 20. Alternatively, the message may be incomplete, e.g. the message may have at least one empty field that is to be filled at a subsequent time.

As indicated by block 24, the method comprises associating the message with a distribution list of one or more intended recipients of the message. The user 20 may enter and/or select the intended recipients using the user interface 22 of the computer 10. Recipients in the distribution list may be identified by e-mail addresses (e.g. for reception by computers having Internet access), and/or instant message (IM) addresses (e.g. for reception by SMS-capable wireless devices). The message and the distribution list are associated with each other in the computer-readable medium 16.

As indicated by block 26, the method comprises associating the message with an identifier. The identifier may be composed by the user 20 using the user interface 22 of the computer 10. The identifier is used to remotely trigger sending of the message to the one or more intended recipients on the distribution list. The message and the identifier are associated with each other in the computer-readable medium 16.

Figure 2:
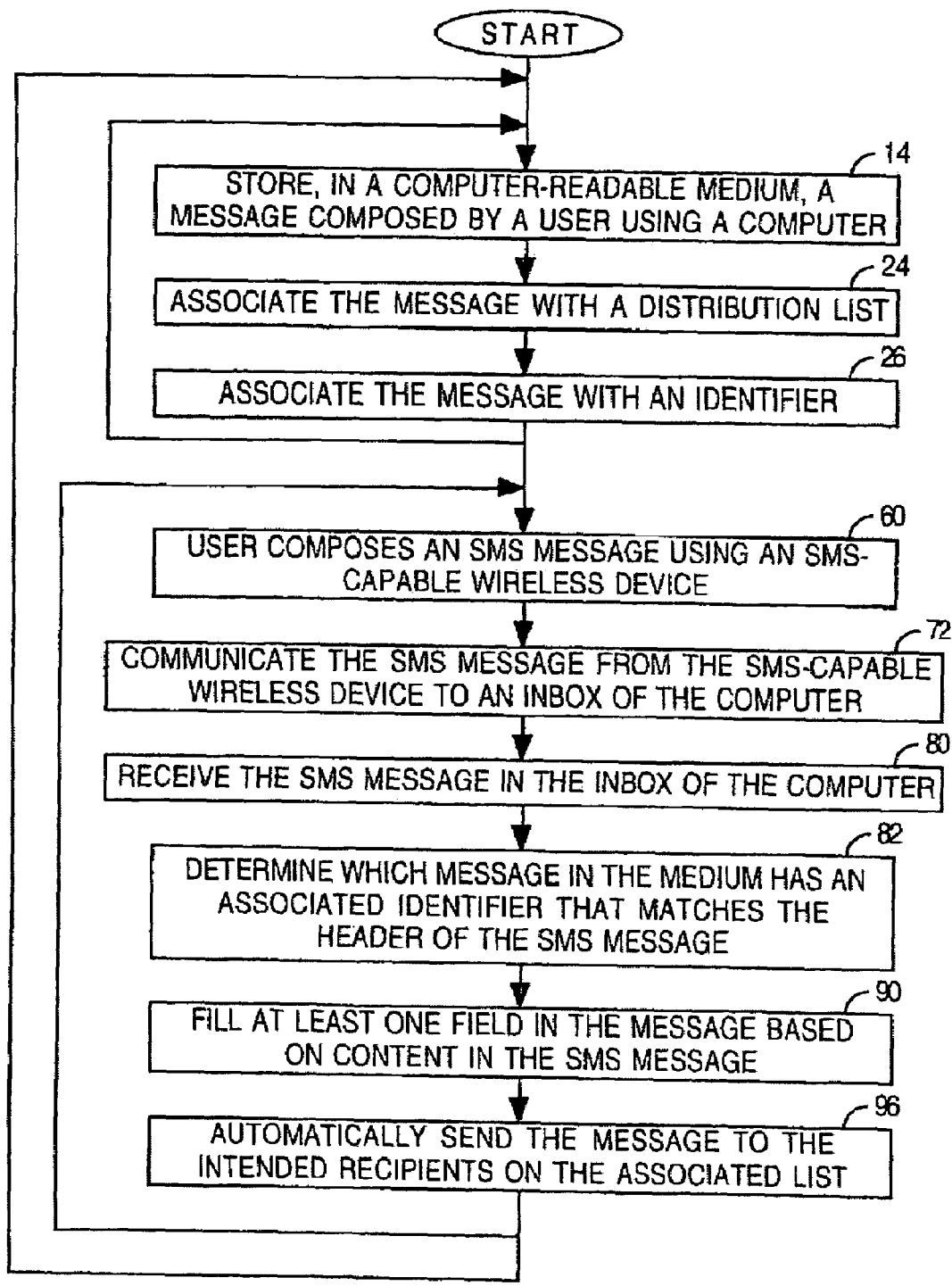
FIG. 2 is a flow chart of an embodiment of a method of triggering messages based on SMS headers and content.

In general, the acts indicated by blocks 14, 24 and 26 may be performed in any order, and need not be performed in the order shown in FIG. 2.

The acts indicated by blocks 14, 24 and 26 may be repeated so that the user 20 composes multiple messages, identifiers and distribution lists using the computer 10. The multiple messages, identifiers and distribution lists are stored in the computer-readable medium 16. For purposes of illustration and example, consider the user 20 composing three messages 30, 32 and 34. The messages 30, 32 and 34 are identified by user-composed identifiers 40, 42 and 44, respectively. The messages 30, 32 and 34 have associated user-entered distribution lists 50, 52 and 54, respectively, but have not yet been sent to the intended recipients listed therein. The distribution lists 50, 52 and 54 may differ from each other, or two or more of the distribution lists 50, 52 and 54 may be the same.

After the user 20 has composed one or more messages using the computer 10, consider the user 20 being located remotely from the computer 10. At the remote location, the user 20 has an SMS-capable wireless device 56 such as an SMS-capable wireless telephone. The user 20 can use the SMS-capable wireless device 56 to trigger sending a particular one of the messages stored in the computer-readable medium 16 to the one or more intended recipients on its associated distribution list.

As indicated by block 60, the method comprises the user 20 composing an SMS message 62 using a user interface 64 of the SMS-capable wireless device 56. Examples of the user interface 64 include, but are not limited to, a keyboard, a voice input device, a touch screen, a touch pad, and a pointing device. Using the user interface 64, the user 20 composes a header 66 and optionally content 70 for the SMS message. The user 20 selects the header 66 to match the identifier of the particular pre-stored message he/she wishes to trigger sending. The user 20 enters the content 70 to fill any empty fields in the particular pre-stored message.

As indicated by block 72, the method comprises communicating the SMS message 62 to an inbox 74 of the computer 10. The SMS message 62 is communicated via one or more telecommunication networks 76 which may include a wireless telephone network and/or the Internet.

As indicated by block 80, the method comprises receiving the SMS message 62 in the inbox 74 of the computer 10. The software 12 is responsive to the reception of the SMS message 62 in the inbox 74 to extract the header 66" and the content 70", if any, from the SMS message 62.

As indicated by block 82, the method comprises determining which of the messages stored in the computer-readable medium 16 has an associated identifier that matches the header 66'. This act is performed by a header-dependent message selector 84 provided by the software 12. The header-dependent message selector 84 causes a message 86, whose associated identifier matches the header 66', to be retrieved from the computer-readable medium 16.

Optionally, as indicated by block 90, the method comprises filling at least one empty field in the message 86 based on the content 70" in the SMS message 62. This act is automatically performed by a field filler 92 provided by the software 12.

The message 86', which may or may not have field(s) filled by the field filler 92, is directed to an outbox 94 of the computer 10. As indicated by block 96, the message 86' is automatically sent from the outbox 94 to one or more intended recipients 98 on its associated distribution list. Thus, the sending of message 86' is automatically triggered based on receiving an SMS message having a header that matches the identifier of the message 86'.

The acts indicated by blocks 60, 72, 80, 82, 90 and 96 may be repeated to trigger sending multiple pre-composed messages that are stored in the computer-readable medium 16.

In the manner described above, the user 20 can compose future message(s) using e-mail and/or PIM software with which he/she is familiar on his/her computer 10. The content can be completely predetermined or may have the form of a template that awaits specific input to fill certain fields. In addition to the content of the message, the user 20 also uses the computer 10 to establish a distribution list and optional rules associated with sending the message. While away from the computer, the user 20 sends an SMS message to the inbox 74 with a specific heading and/or content that triggers the pre-planned message and fills in empty fields as appropriate. In this way, the user 20 need not use his/her SMS-capable wireless device to compose the full message that is to be distributed, and to enter all of the intended recipients in the distribution list. This solution is beneficial for users who do not regularly use SMS for broad communication. Further, recipients of the message need not be sophisticated SMS users.

Examples of using embodiments of the present invention are numerous. Parents may plan an outdoor event for their children and their children's friends and family at a remote location. Prior to leaving the house for the remote location, the parents compose an "in case of bad weather" message using their home computer. The parents compose a distribution list comprising all of the invitees to the event. The parents also compose an identifier such as "weather" to identify the message. When the parents arrive at the remote location, the parents may discover that the remote location is muddy or unusable in another way. Upon discovering the condition of the remote location, the parent sends a triggering SMS having a header of "weather" to her inbox. Based on pre-established rules, the triggering SMS causes the "in case of bad weather" message to be automatically sent to all of the invitees in time for the invitees to change their plans accordingly.

An example of automatically filling fields based on SMS-initiated additional data involves the birth of a child. An expecting father can set up a message template using his home computer to announce the birth of the child. The father identifies the message template by the identifier "baby". The father also sets a distribution list at home using e-mail addresses in his computer's address book. When the father is at the hospital, he can send a triggering SMS to his inbox once the child is born. The triggering SMS has a header of "baby" and content that includes the baby's name, sex, weight, etc. The baby's name, sex and weight are added to the message template, and the resulting message is sent to the intended recipients on the distribution list.

The acts performed by the computer 10 may be directed by computer-readable program code stored by a computer-readable medium.

It will be apparent to those skilled in the art that the disclosed embodiments may be modified in numerous ways and may assume many embodiments other than the forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    storing, in a computer-readable medium, a first message composed by a user using a computer;
    associating the first message with a first distribution list of one or more intended recipients of the first message;
    associating the first message with a first identifier to trigger sending of the first message to the one or more intended recipients on the first distribution list;
    receiving a first SMS message in an inbox of the computer, the first SMS message composed using an SMS-capable wireless device, the first SMS message having a first user-entered header, wherein the first message is stored before the first SMS message is received; and
    based on the first user-entered header matching the first identifier, sending the first message to the one or more intended recipients on the first distribution list.

2. The method of claim 1 wherein the first message composed by the user has at least one empty field, wherein the first SMS message includes user-entered content, the method further comprising:
    filling the at least one empty field in the first message based on the user-entered content in the first SMS message before said sending the first message.

3. The method of claim 1 further comprising before said receiving the first SMS message:
    storing, in the computer-readable medium, a second message composed by the user using the computer;
    associating the second message with a second distribution list of one or more intended recipients of the second message; and
    associating the second message with a second identifier to trigger sending of the second message to the one or more intended recipients on the first distribution list.

4. The method of claim 3 further comprising:
    receiving a second SMS message in the inbox of the computer, the second SMS message composed using the SMS-capable wireless device, the second SMS message having a second user-entered header; and
    based on the second user-entered header matching the second identifier, sending the second message to the one or more intended recipients on the second distribution list.

5. The method of claim 3 wherein the second distribution list differs from the first distribution list.

6. The method of claim 1 wherein the first identifier is composed by the user using the computer.

7. A system comprising:
a computer-readable medium which stores a first message composed by a user using a computer, an associated first distribution list of one or more intended recipients of the first message, and an associated first identifier to trigger sending of the first message to the one or more intended recipients on the first distribution list;
an inbox to receive a first SMS message composed using an SMS-capable wireless device, the first SMS message having a first user-entered header, wherein the computer-readable medium stores the first message before the inbox receives the first SMS message; and
a header-dependent message selector responsive to the inbox to semi the first message to the one or more intended recipients on the first distribution list based on the first user-entered header matching the first identifier.

8. The system of claim 7 wherein the first message composed by the user has at least one empty field, wherein the first SMS message includes user-entered content the system further comprising:
an automatic field filler responsive to the inbox to fill the at least one empty field in the first message based on the user-entered content in the first SMS message before the first message is sent to the one or more intended recipients.

9. The system of claim 7 wherein the computer-readable medium further stores, before the first SMS message is received, a second message composed by the user using the computer, an associated second distribution list of one or more intended recipients of the second message, and an associated second identifier to trigger sending of the second message to the one or more intended recipients on the second distribution list.

10. The system of claim 9 wherein the inbox is to receive a second SMS message composed using the SMS-capable wireless device, the second SMS message having a second user-entered header, and wherein the header-dependent message selector is responsive to the inbox to send the second message to the one or more intended recipients on the second distribution list based on the second user-entered header matching the second identifier.

11. The system of claim 9 wherein the second distribution list differs from the first distribution list.

12. The system of claim 7 wherein the first identifier is composed by the user using the computer.

13. A computer-readable medium having computer-readable program code to cause a computer to perform acts comprising:

storing a first message composed by a user using the computer;
associating the first message with a first distribution list of one or more intended recipients of the first message;
associating the first message with a first identifier to trigger sending of the first message to the one or more intended recipients on the first distribution list;
receiving a first SMS message in an inbox of the computer, the first SMS message composed using an SMS-capable wireless device, the first SMS message having a first user-entered header, wherein the first message is stored before the first SMS message is received; and
based on the first user-entered header matching the first identifier, sending the first message to the one or more intended recipients on the first distribution list.

14. The computer-readable medium of claim 13 wherein the first message composed by the user has at least one empty field, wherein the first SMS message includes user-entered content, the acts farther comprising:
filling the at least one empty field in the first message based on the user-entered content in the first SMS message before said sending the first message.

15. The computer-readable medium of claim 13 wherein the acts further comprise before said receiving the first SMS message:
storing, in the computer-readable medium, a second message composed by the user using the computer;
associating the second message with a second distribution list of one or more intended recipients of the second message; and
associating the second message with a second identifier to trigger sending of the second message to the one or more intended recipients on the first distribution list.

16. The computer-readable medium of claim 15 wherein the acts further comprise:
receiving a second SMS message in the inbox of the computer, the second SMS message composed using the SMS-capable wireless device, the second SMS message having a second user-entered header; and
based on the second user-entered header matching the second identifier, sending the second message to the one or more intended recipients on the second distribution list.

17. The computer-readable medium of claim 15 wherein the second distribution list differs from the first distribution list.

18. The computer-readable medium of claim 13 wherein the first identifier is composed by the user using the computer.

* * * * *

UNITED STATES PATENT AND TRADEMARK OFFICE
CERTIFICATE OF CORRECTION

PATENT NO. : 7,221,953 B2  Page 1 of 1
APPLICATION NO. : 11/092139
DATED : May 22, 2007
INVENTOR(S) : Mark Kenneth Roche It is certified that error appears in the above-identified patent and that said Letters Patent is hereby corrected as shown below:

In the Claims section, column 5, line 18, "semi" should be changed to --send--.

In the Claims section, column 6, line 19, "farther" should be changed to --further--.

Signed and Sealed this

Twenty-seventh Day of May, 2008

JON W. DUDAS
*Director of the United States Patent and Trademark Office*